Sept. 5, 1950  E. W. KAY ET AL  2,521,012
HELICOPTER

Filed Nov. 26, 1946  6 Sheets-Sheet 1

INVENTOR.
BY EUGENE W. KAY
ROBERT L. FORTNER
Harold W. Mattingly
Attorney

Sept. 5, 1950     E. W. KAY ET AL     2,521,012
HELICOPTER
Filed Nov. 26, 1946     6 Sheets-Sheet 3

INVENTOR.
EUGENE W. KAY
BY ROBERT L. FORTNER
Harold W Mattingly
Attorney

Sept. 5, 1950 E. W. KAY ET AL 2,521,012
HELICOPTER
Filed Nov. 26, 1946 6 Sheets-Sheet 5

INVENTOR.
EUGENE W. KAY
BY ROBERT L. FORTNER
Harold W. Mattingly
Attorney

INVENTOR.
EUGENE W. KAY
ROBERT L. FORTNER
BY
Harold W Mattingly
Attorney

Patented Sept. 5, 1950

2,521,012

UNITED STATES PATENT OFFICE 2,521,012

HELICOPTER

Eugene W. Kay and Robert L. Fortner,
Glendale, Calif.

Application November 26, 1946, Serial No. 712,354

2 Claims. (Cl. 170—135.22)

Our invention relates to helicopters, and relates more particularly to a flexible mounting for the rotors relative to the fuselage and also relates to the rotor controls for rotors thus mounted.

It is well known that rotors of helicopters and the mounts for the rotor shafts must be designed much more strongly than considerations of lifting alone would require. This is due in a large measure to the severe loads imposed upon the rotors by adverse wind conditions, such as updrafts, "bumpy" air, and other disturbances. The rotors are generally of large blade area, and any unevenness in the air exerts a considerable force upon the rotor surfaces. Further, the rotor blades are frequently of great length and loads thus imposed upon the tips give rise to large bending moments at the hub. This stress on rotor blades is intensified due to the fact that a large part of the weight of the helicopter is in the fuselage, and accordingly the fuselage has a large mass with a correspondingly large inertia. Therefore the fuselage is relatively immovable with respect to the disturbances absorbed by the rotors, and accordingly the rotors must be designed to withstand the resultant bending moments.

Our invention overcomes these disadvantages of prior helicopters by providing a flexible connection between the fuselage and the rotors. The fuselage in effect may become a suspended body supported by the rotors. The fuselage thus acquires characteristics of a body with freedom of motion and the fuselage may change its position relative to the rotors when external forces are applied to the fuselage, and likewise the rotors may change their position relative to the fuselage when external forces are applied to the rotors.

Our invention also includes means for limiting the flexibility of the connection and also for restoring the normal relationship when the external forces are removed. Accordingly the pilot of the helicopter does not have to correct for these angular deviations from the normal relationship, and the fuselage and rotors are automatically returned to their original position.

It is evident that the provision of such a flexible joint materially reduces the stresses in the rotors and at the same time relieves the pilot of the helicopter from the task of correcting the position of the helicopter when it is displaced by external forces. The invention makes possible, therefore, not only a lighter construction for helicopters, but also results in greater stability for helicopters.

The provision of a flexible connection between the rotors and fuselage makes necessary controls for the rotor blades that can be suitably operated despite the flexible connection. Accordingly, therefore, our invention also includes non-mechanical controls for the pitch of rotor blades, and in our preferred embodiment we employ fluid pressure, preferably hydraulic pressure. The pilot of the helicopter is thus enabled to accurately control the pitch during all stages of a single rotation of the blades, as well as the overall pitch of the blades, even while the connection between the rotors and the fuselage is constantly changing in angle. Further, these controls are operated in a novel manner so that the control of a helicopter may take place by the use of a conventional control column as used in commercial types of airplanes.

While our invention is applicable to any type of helicopter, at present we consider that it may most advantageously be applied to helicopters having contra-rotating rotors either of the coaxial or axially displaced type. Our invention will accordingly, therefore, be described with reference to a dual-rotor helicopter of the axially displaced type. In such dual-rotor helicopters the rotors are adapted to intermesh with each other and the axes thereof may be either parallel and the rotors formed along the surface of a cone, or the axes of the rotors may be inclined with respect to each other and a planar type of rotors employed. The present invention will be described, however, with respect to a helicopter wherein the two axes are displaced from each other and inclined with respect to each other, and wherein the rotors are formed along the surface of a flat cone.

In applying our invention to dual rotors of the intermeshing type we have also provided mechanisms that are useful and desirable in this type of helicopter, and accordingly we have improved upon the conventional gearing mechanism for intermeshing helicopters and have eliminated the conventional cross shaft normally employed for driving the two rotors from a single power source. Further, we have so designed the gearing that it may be disposed within a single gear box which may be mounted for universal movement within the fuselage, the power being supplied thereto through universal joints.

Also our invention incorporates a mechanism for stopping the harmonic vibration of the rotors, which vibration appears at present to be characteristic of helicopter designs. The elimination of this harmonic vibration not only insures greater safety of operation, but also makes transportation in a helicopter more enjoyable.

It is therefore a general object of our invention to provide a flexible connection for securing the rotors of a helicopter to the fuselage thereof.

Another general object of our invention is to provide a universal joint type of suspension for the fuselage of a helicopter relative to the rotors thereof.

Another object of our invention is to provide a flexible connection between helicopter rotors and fuselage, which connection is automatically self-orienting when in an unstressed condition.

Still another object of our invention is to provide a helicopter with controls that are operable with a flexible connection between the rotors and the fuselage of the helicoper.

Another object of our invention is to provide an improved intermeshing type of helicopter.

Still another object of our invention is to provide an intermeshing type of helicopter with a flexible connection between the rotors and the fuselage.

A further object of our invention is to provide a flexibly mounted gear box for intermeshing types of helicopters to which the rotors are rigidly secured, providing a flexible connection between the rotors and the fuselage.

Another object of our invention is to provide an improved type of joint for helicopter blades permitting the blades to move in an axial direction and also in an axially transverse direction with respect to the rotor axis.

Another object of our invention is to provide a mechanism for helicopters for injecting a pulse of energy into the rotor system of helicopters for breaking up harmonic vibrations therein.

Still another object of our invention is to provide a control system for helicopters adapted to employ control column movements.

Other objects and advantages of our invention will be apparent in the following description and claims, considered together with the accompanying drawings, in which:

As mentioned previously, we have selected an intermeshing type of helicopter as a presently preferred type of helicopter for embodying our invention. Our invention is definitely not limited to this type of helicopter, as it may be usefully employed in any type of rotor system. The following description, therefore, is an illustrative showing of one form of our invention, and is not to be construed as the sole or exclusive form in which it may be used.

Figure 1:
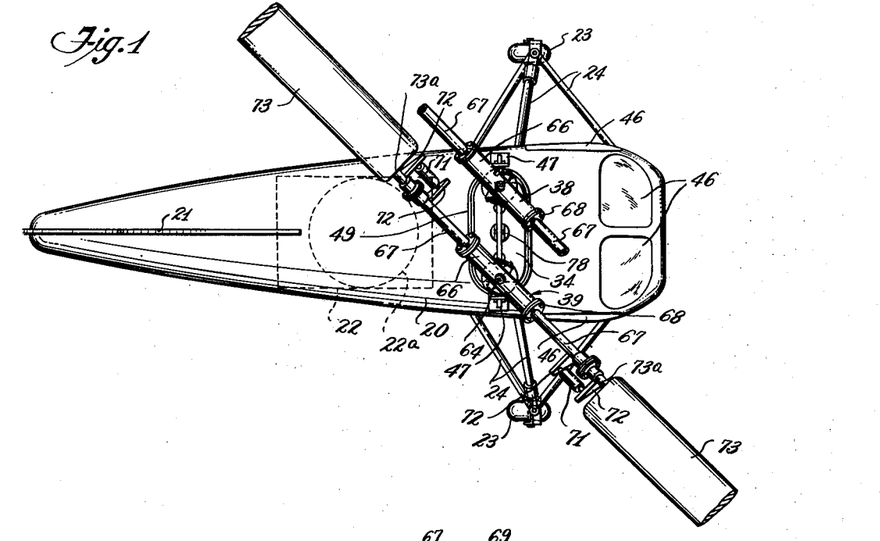
Fig. 1 is a plan view of an intermeshing type of helicopter embodying our invention and having portions of the rotors thereof broken away.
Figure 2:
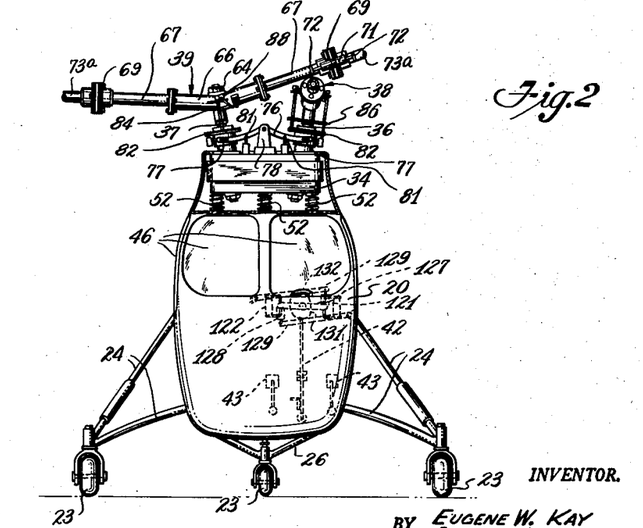
Fig. 2 is a front elevation view of the helicopter of Fig. 1 and also having portions of the rotor structure broken away but showing the rotor structure in an intermeshing position.
Figure 3:
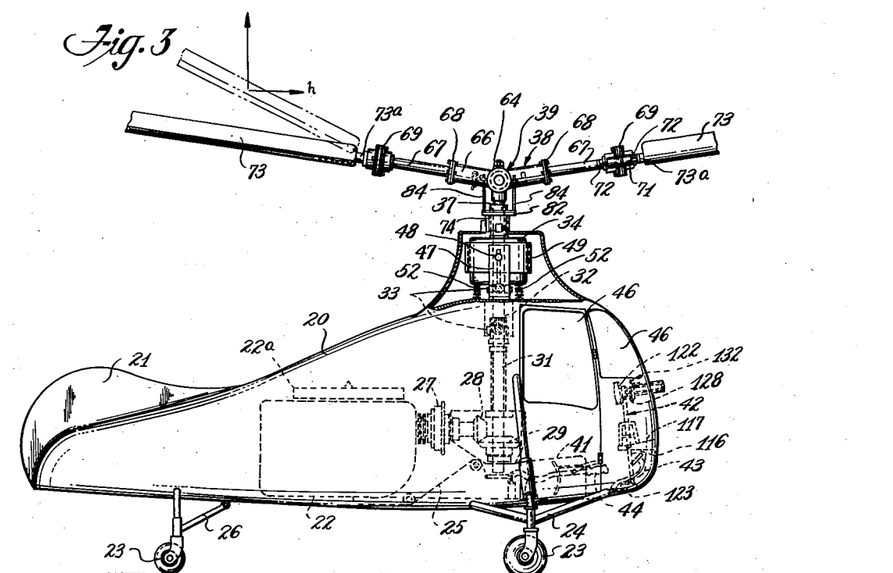
Fig. 3 is a side elevation view of the helicopter of Fig. 1 showing the disposition of motor units, drive units, and control units in the fuselage thereof.

Referring to Figs. 1, 2 and 3, a helicopter may include a fuselage 20 having a vertical stabilizing fin 21 and having a motor 22 disposed therein having a cooling fan 22a. The motor may be of any desired type, such as an air-cooled or liquid-cooled, in-line or radial. When the helicopter is resting upon the ground it may be supported by three wheels 23, supported by forward strut members 24 and a rear wheel brace 26.

The motor 22 may drive through a clutch 27 of any suitable type, either mechanical or liquid-filled, which mechanism may also include a gear reducer if this is desired. The engine drive may carry a universal joint and terminate in a bevel pinion gear 28 engaging a large bevel gear 29 secured in turn to a vertical drive shaft 31. A short shaft 32 having universal joints 33 on each end thereof, one of which may have a splined connection with the drive shaft 31, connects the drive shaft 31 with a flexibly mounted gear box 34 mounted and constructed particularly in accordance with the invention. The gear box 34 causes rotor shafts 36 and 37 to rotate, which shafts cause rotors 38 and 39, respectively, to rotate.

A pilot for the helicopter may be disposed upon a seat 41 and may actuate controls within the helicopter, including a control column 42 for controlling the direction and horizontal speed of the helicopter, and may also include foot pedals 43 and a hand lever 44 for controlling the lift of the rotors 38 and 39. Windows 46 may be provided for the pilot.

It is well known to those skilled in the helicopter art that helicopter control and construction may be simplified by the employment of two principal rotors rotating in opposite directions so that their torques cancel each other. This is in contrast to single rotor designs wherein an auxiliary propeller or rotor must be provided at right angles to the main rotor axis for combatting the torque developed by the principal rotor. Accordingly, therefore, the gear box 34 is so designed that the rotors 38 and 39 rotate in opposite directions.

Figure 4:
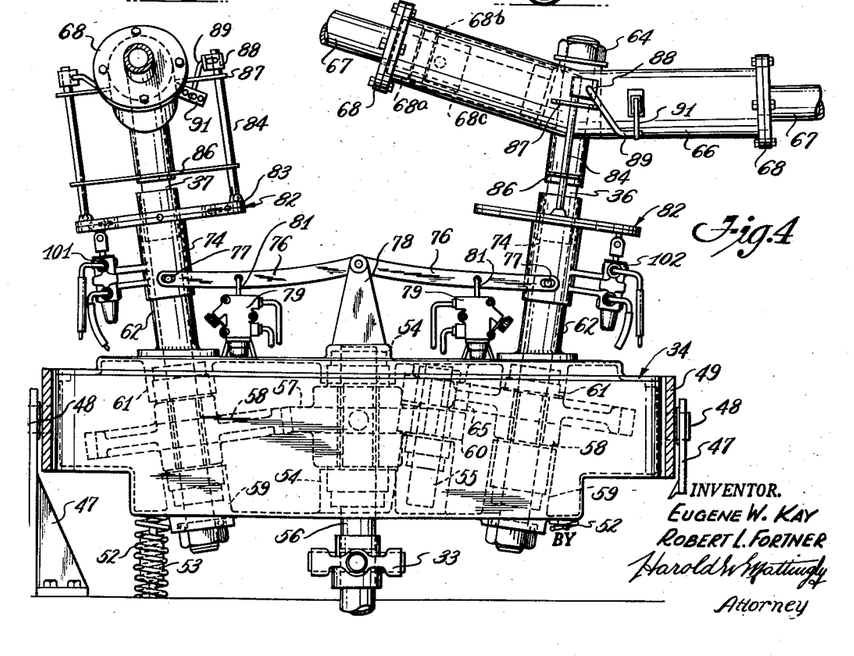
Fig. 4 is a front elevation view of the flexibly mounted gear box of the helicopter of Fig. 1, which gear box also retains the rotor shafts.
Figures 5, 6, 7, 8, 9, 10, 11:
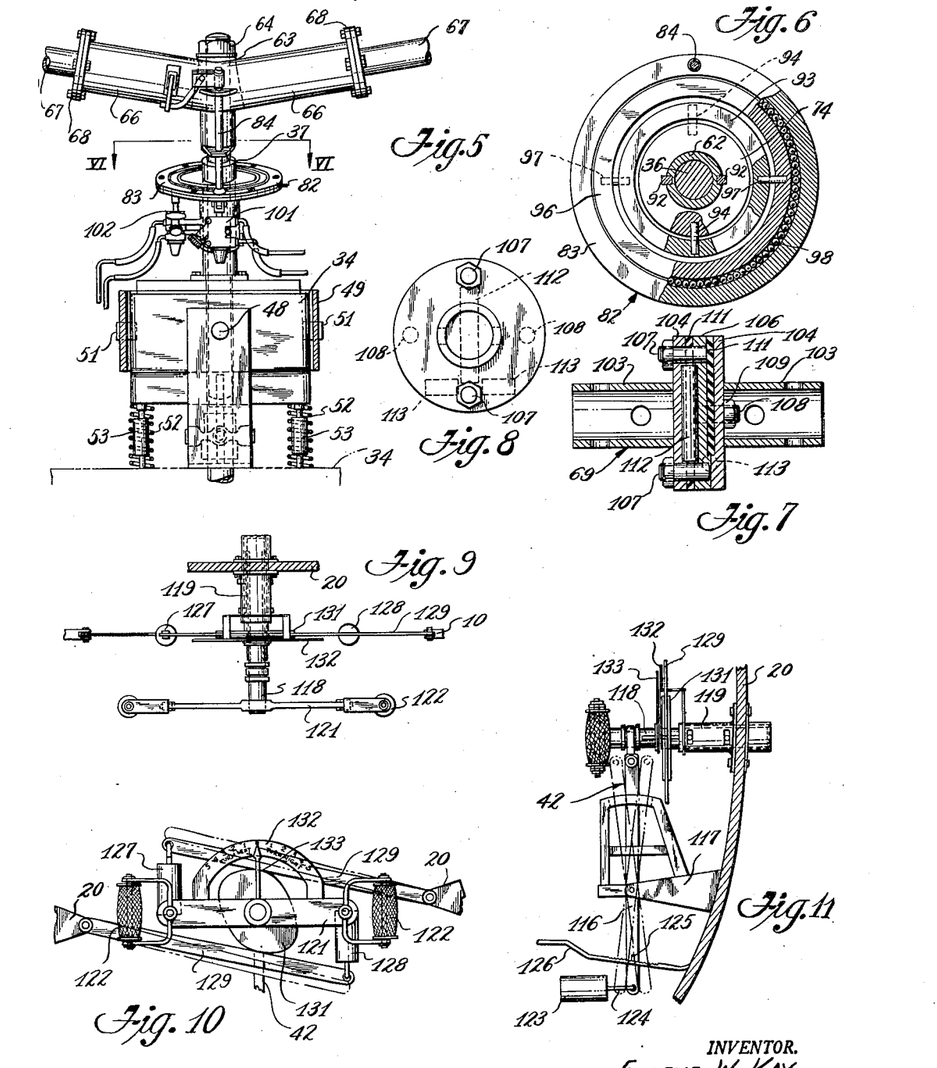
Fig. 5 is a side elevation view of the flexibly mounted gear box of Fig. 4.
Fig. 6 is a plan view of the universally movable wobble-plate structure for controlling the pitch of the rotor blades, as taken along the line VI—VI of Fig. 5, and also having portions broken away.
Fig. 7 is an elevation view in full section through the spar joint embodying our invention.
Fig. 8 is an end view of the spar joint of Fig. 7.
Fig. 9 is a top view of the control mechanism for the helicopter of Fig. 1.
Fig. 10 is an elevation view of a portion of the control mechanism of Fig. 9.
Fig. 11 is a side elevation view of the control mechanism of Fig. 9.

Referring to Figs. 3, 4 and 5, the gear box 34 may be supported by two vertically disposed brackets 47 connected by means of pins 48 to a gimbal ring 49. The gimbal ring 49 in turn supports two pins 51 disposed along an axis at right angles to the two pins 48, and they connect the gear box 34 to the gimbal ring. The gear box 34 accordingly may rock along the axis of the fuselage 20 by rotation about the pins 51, and may rotate transversely to the fuselage 20 by rotating on the pins 48. This mounting structure, therefore, gives the entire gear box 34 a universal movement, allowing it to assume any angle desired with respect to the fuselage 20. The gear box 34 may be resiliently held at a fixed position with respect to the fuselage 20 by a plurality of springs 52 which are illustrated as coil springs, although it will be apparent that any other type of spring may be used or spring substitutes, such as rubber blocks, may be used. Dampening devices may also be employed to smooth out the resilient universal movements of the gear box 34, and may be in the form of shock absorbers 53 which may be hydraulic, mechanical, or any other type. The springs and shock absorbers may be disposed in any desired pattern; for example, one at each corner of the gear box 34. The angular movement of the gear box may have any desired upper limit; for example a cone of movement of 16°.

Disposed within the gear box 34 are bearing members 54 which may journal a shaft 56 connected to the upper universal joint 33 and upon which may be mounted a spur gear 57 having tapered teeth. The spur gear 57 drives in turn two spur gears 58 that are oppositely disposed with respect to it, and which gears are mounted on the two rotor shafts 36 and 37. While the drive of one gear 58 may be direct, the drive of the other may be through an idler shaft 55 having gears 60 and 65 engaging the spur gear 57 and one gear 58, respectively. The two rotor shafts in turn may be journaled in lower bearing members 59 and upper bearing members 61. All bearing members of the gear box 34 and bearings elsewhere in the helicopter preferably include ball bearing elements to reduce friction and prolong the life of the journal.

The direct drive for one of the rotor shaft gears 58 and the drive through the idler shaft for the other causes these two gears and their respective shafts to rotate in opposite directions. This employment of a central driving gear along an axis generally aligned with the rotor axes also eliminates the conventional cross shaft commonly employed in intermeshing types of helicopters.

The upwardly projecting ends of the rotor shafts 36 and 37 may be guided in bushings 62 that are welded or otherwise secured to the gear box 34. A conical bushing 63 may be keyed or otherwise secured to the outer ends of the rotor shafts 36 and 37, and may be held axially thereon by a nut 64. Hub members 66 may be disposed upon and secured to the conical bushing member 63, and may in turn support a pair of rotatable blade spars 67 held therein by collars 68 bolted to the outer ends thereof. Each hub 66 retains radial load ball bearings 68a and thrust ball bearings 68b acting against a collar 68c pinned to the spar 67.

Referring to Figs. 1 and 3, it will be noted that each spar 67 is provided with a flexible joint 69 across which may be disposed a vibration absorber 71 secured to the opposite ends of the flexible joint by projecting brackets 72. The spars 73a of blades 73 may be secured to the outer end of the flexible joint 71 and these blade surfaces 73 form the lifting elements for the helicopter. In this connection it may be noted that the cross sectional contour of the blade surfaces 73 may be in airfoil form to obtain the lifting characteristics conventionally attained on an airplane wing. As is well known, the amount and direction of vertical movement of a helicopter is attained by varying the angle of attack of the blade surfaces with respect to their surface of rotation. In other words, the steeper the pitch on the surfaces 73, the greater will be the lift for the helicopter. Our invention accordingly includes a mechanism for varying the overall pitch or angle of attack of the blade surfaces 73 with respect to the surface of rotation of the blades or with respect to the axis of their rotor.

Referring again to Figs. 4 and 5, it will be noted that the bushings 62 have disposed thereupon a sleeve 74 that is slidable thereon. The sleeves 74 are moved up and down along the bushings 62 by means of arms 76 engaging projecting pins 77 by means of elongated slots in the ends thereof. Each arm 76 is pivoted on its other end to a single fulcrum member 78 secured to the top of the gear box 34. Hydraulic slave motors 79 may be fastened to the top of the gear box 34 and may connect to a central portion of each arm 76. The flow of fluid to the slave cylinders 79 is performed by a master cylinder operated by the helicopter pilot, as will be explained more fully hereinafter, and a projecting piston rod 81 moved in accordance with the fluid flow, moving the arms 76 upwardly and downwardly and in turn sliding the sleeves 74 on the bushings 62.

Secured to the upper end of the sleeves 74 may be a wobble plate structure 82 which includes an external annulus 83 to which two links 84 may be flexibly secured as by means of a ball-and-socket joint. The links 84 may be loosely guided by suitable means such as projecting brackets 86 and 87 secured, respectively, to the conical bushing 63 and the hub member 66. An adjustable ear 88 may be secured to the upper end of the links 84 and may be connected by a bell-crank 89 to an arm 91 projecting through suitable apertures in the hub members 66 and rigidly secured to the rotatable blade spars 67. Each blade spar of a rotor may accordingly be connected for rotation to the wobble plate 82 by means of the arm 91, bell-crank 89, ear 88, and link 84, as just described. In the case of two blade rotors such as those illustrated, there will be two such sets of mechanisms for rotating the blade spars.

Rotation of the blade spars 67 and consequently rotation of the blade surfaces 73 is effected by raising and lowering the sleeves 74 on the bushings 62 by means of fluid pressure supplied to the slave cylinder or motor 79, which acts in turn on the pivoted arms 76. If the sleeve 74 is raised, the links 84 are raised and the bell-crank 89 pulls the spar arm 91 upwardly, rotating the spar through a corresponding angle. If the sleeve 74 is lowered, the arm 91 moves downwardly accordingly, rotating the blade spars 67 in an opposite direction.

While the overall lift of a helicopter may be varied by varying the overall pitch of the blade surfaces 73, horizontal flight is obtained by varying the pitch of the blades throughout a single rotation of the rotors, as is well known in the helicopter art. Accordingly, therefore, our invention also includes a mechanism for obtaining this variation of pitch of blade surfaces 73 during a single rotation. This function is also performed by the wobble plate structure 82, shown in detail in Fig. 6. There it will be noted that the sleeve 74 is keyed or otherwise secured against rotation to the bushing 62 by any suitable means, such as keys 92. A central annulus 93 may be secured to the flangelike upper portion of the sleeve 74 by means of two diametrically opposed pins 94. A second annulus 96 is secured to the first annulus by means of two diametrically opposed pins 97 aligned along an axis at right angles to the pins 94. The outer annulus 96 may be circumferentially recessed to receive a plurality of balls 98 acting as bearings for the outer annulus 83 which may be of split construction that is internally grooved and that rotates with the rotors 38 and 39 because of the connection of the guided pitch links 84 therewith, as previously described. The opposed sets of pins interconnecting the two annuli provide for a universal movement, permitting the outer ring 83 to assume any desired angle with respect to the rotor shafts 36 and 37.

The outer two rings 96 and 83 of the wobble plate are tilted with respect to the axis of the rotor by means of two hydraulic cylinders 101 and 102 disposed outboard and to the rear, respectively, of each rotor shaft 36 and 37. The two hydraulic cylinders or slave units are secured to the slidable bushing 74 and each has a piston rod connected to the non-rotatable outer ring 96 of each wobble plate. The outboard motor 101 accordingly may rotate the wobble plate about one set of pins 94 and 97, and the other motor or slave unit may rotate the wobble plate about the other set of pins 94 and 97. Accordingly, therefore, the wobble plate may be rotated to any selected angle so that the outer rotatable ring 83 thereof will cause the links 84 and the blade shafts to travel up and down in accordance with the angle thus selected. The tilting of the wobble plate does not affect the overall pitch adjustment previously described with respect to the positioning of the sleeve 74 on the bushing 72, inasmuch as the slave units 101 and 102 for effecting the tilt of the wobble plate are rigidly secured to the sleeve and move in accordance with the overall pitch setting. By tilting the wobble plate accordingly with respect to the rotor shafts 37 and 36 about which each one is disposed, the pitch of the blade surfaces 73 may be varied during any single rotation of the rotors.

As noted previously, our invention also includes a flexible spar joint 69 of novel construction, which joint is located outwardly from the hub 66 of each rotor and adjacent to the inner end of the blade surfaces 73. This flexible joint permits the blade surface portion of each blade to flex upwardly as far as 15° in response to the lifting load imposed upon the blade. This upward flexing of the blade spar is generally the result of a large amount of pitch being imposed upon the blade surfaces 73, and is particularly important when this large amount of pitch is imposed because of the tilting of the wobble plate 82. As shown in Fig. 3, the blade surface 73 may be caused to tilt upwardly when the blade surfaces rotate to the rear of the helicopter. This severe flexing of the blade surface 73 gives rise to a horizontal component $h$ of force imposed upon the flexed blade 73, which horizontal component is not opposed by a corresponding force on the blades when rotating about the forward end of the helicopter, inasmuch as there may be little pitch imposed upon the blades at the forepart of the helicopter. Accordingly, therefore, this horizontal component of force will cause the entire helicopter to proceed in a forward direction. It will be realized from the wobble plate structure just described that the blades may be subjected to a maximum pitch at any selected portion of a single cycle of rotation, and accordingly the helicopter may be caused to move in any selected direction, either sideways, forward or backward.

Our flexible joint 69 also provides for a limited flexing of the blade spar in a plane along its direction of movement of rotation. This fore and aft flexing is desirable when the helicopter is traveling at an appreciable rate of speed in a horizontal direction. When the helicopter is traveling in a horizontal direction it will be appreciated that the blade surfaces 73 that are rotating in the same direction as the movement of the helicopter will be subjected to a greater relative air speed than will be experienced when the blades are at the portion of their cycle of rotation where they are moving in the opposite direction from the helicopter movement. When moving against the wind, accordingly, there will be a much greater horizontal load imposed upon the blade surfaces 73, and for this reason it is desirable to provide a flexible joint to relieve the stresses that are thus suddenly imposed upon the rotor. When the blades reach the portion of their cycle of rotation where this load is materially reduced, the flexible joint allows them to return to the normal position, or if the release of load is sufficiently great the blade surfaces 73 may even flex ahead of the spar axis.

The detail structure of our joint 69 for effecting these ends is shown in Figs. 7 and 8. The joint accordingly may include two flanged tubular members 103 having flanges designated by the numeral 104. The tubular members 103 are adapted to slip over and to be bolted to their respective blade spar portions. The joint also includes an intermediate circular plate member 106 having two pairs of studs 107 and 108, respectively, secured thereto and projecting outwardly from opposite surfaces thereof. The studs 107 and 108 may pass through their respective flanges 104 and be secured thereto by nuts 109. Pads of rubber 111 may be disposed between the flanges 104 and the plate 106 to provide a resilient cushion which gives rise to the flexing action of the joint. This flexing action is further controlled, however, by the provision of rollers set at right angles to each other. Accordingly a long roller 112 may be disposed in a generally vertical position between the plate 106 and the flange 104 of the inner tubular member 103 and two rollers 113 may be disposed along a horizontal axis between the outer tubular member 103 and the inner plate 106, but at the bottom thereof inasmuch as the flexing in a vertical direction is to be limited to an upward movement only. The fore and aft flexing of the blade spar accordingly takes place about the vertical roller 112, compressing the rubber on either side thereof. The upward flexing of the blade spar takes place about the two horizontal rollers 113, which flexing compresses the rubber pad disposed above these two rollers. The studs 107 and 108 may loosely fit within the holes through the flanges to allow for this flexing action. This structure accordingly provides a very simple and rugged flexible joint for the helicopter of our invention, and therefore materially assists in carrying out the aims of our invention. The flexing may be 15° upwardly, and 6° fore and aft.

A presently preferred form of controls for the helicopter of our invention is illustrated in Figs. 9, 10 and 11. These figures show only the mechanical portions of the controls, as the complete hydraulic system will be described in more detail with respect to Fig. 12. These controls of Figs. 9, 10 and 11 control the tilting of the wobble plate of Figs. 4, 5 and 6 as just described, and accordingly the controls are set up primarily in terms of forward and reverse movement of the helicopter and left turn and right turn of the helicopter. Accordingly, therefore, the controls may include a conventional control type column such as the control column 42 including a vertical lever 116 pivoted at an intermediate point to a bracket 117 secured to the inner side of a fuselage member which may be the front skin member of the fuselage 20. The upper end of the lever 116 may be loosely pivoted to a rotatable shaft 118 adapted to slide in and out and rotate in a bearing cup 119 fastened to the fuselage member 20. A cross arm 121 may be secured to the outer end of the rotatable shaft 118 and may have secured to its outer ends handle grip members 122. Accordingly, therefore, the helicopter pilot may grasp the two grips 122 in either hand and pull the shaft 118 toward him or push it away from him, or he may rotate it in either direction.

A master cylinder 123 may be secured to the fuselage of the helicopter and have its movable element 124 pivoted to the bottom end of the lever 116. As will be described later, this master cylinder 123 or its equivalent will supply fluid to the rearwardly disposed wobble plate actuating cylinders 102, which cause the wobble plate to tilt about its transverse axis, giving forward and rearward flight directions to the helicopter. The lower end of the lever 116 may also be provided with a projecting lug 125 which may contact a notched bracket 126 which may be resiliently secured to the fuselage 20 so as to engage the lug. This lug tends to hold the lever 116 in any preselected position. The lever may be released by the pilot by merely pressing the outer end of the bracket 126 downwardly, and thereafter the lever 116 may be freely moved.

The sideways movement of the helicopter, either to the left or to the right, is controlled by the rotation of the cross arm 121. Accordingly two master cylinders 127 and 128 may be provided, each controlling one of the two outwardly disposed wobble plate actuating cylinders 101. These master cylinders may be operated by means of levers 129 pivoted on one end to the fuselage 20 and on the other end to the movable element of the master cylinders. A cam 131 may be keyed to the shaft 118 and accordingly rotate with the shaft, but may be held by stops to a preselected position along the axis of the shaft. The cam 131 is adapted to engage the two levers 129, urging them apart for movement of the helicopter to the right, and permitting them to move toward each other due to the internal spring mechanism of the master cylinders 128 and 129 for movement of the helicopter to the left. A graduated indicator surface 132 may be secured to the fuselage 20 in any desired manner, and an indicating arrow 133 may be used to read against the indicator surface 132 for determining the speed of movement to the right or left.

Figure 12:
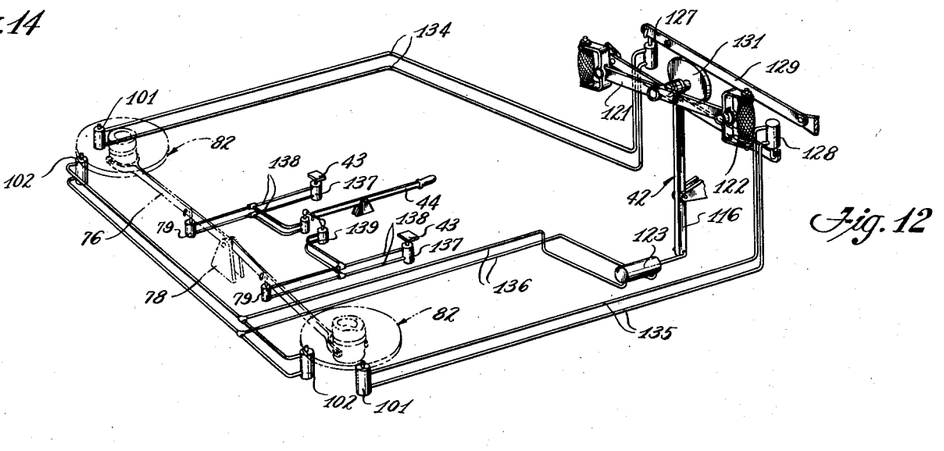
Fig. 12 is a schematic diagram of a hydraulic control system embodying our invention which may be used to control the helicopter of Fig. 1.

The entire hydraulic system for controlling the helicopter is illustrated schematically in Fig. 12 wherein the mechanical portions previously described may be readily identified. There it will be noted that the two cam actuated motor cylinders 127 and 128 are connected by flexible conduits 134 and 135, respectively, to their respective wobble plate actuating cylinders 101. The fore and aft master cylinder 123 may be connected by flexible conduits 136 to the rearwardly disposed wobble plate actuating cylinders 102. It will be appreciated, however, by those skilled in the hydraulic art, that more exact control of the fore and aft actuating cylinders 102 may be obtained by the provision of a separate master cylinder for each actuating cylinder, as indicated for the actuating cylinders 101. Accordingly, therefore, the showing of a single master cylinder 123 does not limit the invention to this specific construction.

Still referring to Fig. 12, it will be noted that the overall pitch of the rotor blades may be changed simultaneously by means of the hand operated lever 44 as described with reference to Fig. 1, or may be individually adjusted by means of the separate foot pedals 43, also identified in Fig. 1. Each foot pedal 43 may be provided with a master cylinder 137 connected by conduits 138 to the pitch slave motor 79 previously identified with respect to Fig. 4. The hand lever 44 may be provided with two master cylinders 139, each connected to its respective set of conduits 138 for actuation of the pitch motors 79. Another feature of our overall pitch control is the interconnection of the lever 44 with the throttle control for the engine 22. Accordingly, therefore, as shown in Fig. 3, we provide a cable 25 interconnecting the end of the lever 44 with the throttle control of the motor 22. Therefore, as the pitch of the rotors is increased, the power output of the motor 22 is automatically increased to compensate for this added load. The individual control of the pitch of each rotor by means of the foot pedals 43 allows for precise adjustment of the pitch of each rotor independently so that each rotor may exactly counterbalance the other rotor. This results in completely counterbalancing the torque of each rotor so that the helicopter may proceed entirely in accordance with the directional controls through the wobble plates.

Figure 13:
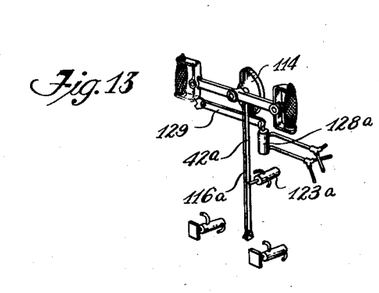
Fig. 13 is a partial showing of a modification of the hydraulic control system for a helicopter.

Shown in Fig. 13 is a simplified form of control column 42a wherein a cam 114 may act upon a single pivoted lever 129a to actuate a single master cylinder 128a connected to both of the outwardly disposed wobble plate actuating cylinders 101. Likewise the control column lever member 116a may be pivoted at the bottom and a master cylinder 123a may actuate the forward and aft wobble plate movements.

Our hydraulic control system is shown schematically only as we do not care to limit ourselves to any precise details. Any desired system of hydraulic controls may be used. For example the commercially available Isodraulic controls may be used which contain essentially the mechanism described on pages 72 and 73 of "Aircraft Hydraulics," by Adams, 1943. These and various other controls may be used, and the schematic showing merely represents double acting master cylinders connected to double acting slave cylinders.

The general operation of our helicopter shown in Figs. 1 through 13 may best be explained with reference to Figs. 1, 2 and 3. The motor 22 delivers power through the clutch and gear reducing mechanism 27 to the bevel gear 28 which in turn drives the large bevel gear 29 connected to a vertical shaft 31 which in turn is connected through a pair of universal joints 33 to the flexibly mounted gear box 34 made particularly in accordance with the invention. Gearing mechanism within the box 34 causes the two rotors 38 and 39 to rotate in opposite directions in an intermeshing manner. The blade spars 67 are rotatably mounted within the hub 66 for each rotor and when these spars 67 are rotated to give sufficient pitch to the blade surfaces 73, the helicopter will rise from the ground and assume vertical flight. The overall pitch of the blade surfaces 73 is controlled by raising and lowering the wobble plate 82.

Directional flight in a horizontal plane may be obtained by tilting the wobble plate 82 with respect to the rotor axis, causing an increased pitch to be imposed upon the normal pitch setting for a particular part only of the cycle of rotation. For example, the wobble plate 82 may be tilted to cause the blade surfaces 73 to have an increased pitch when they rotate to the rear of the helicopter, which increased pitch causes an increase in lift. The increase in lift acts through the flexible joint 69 mounted on the blade spars 67, causing the blade to assume an angle with respect to the blade spar such as that shown in broken outline in Fig. 3. A horizontal component is thus produced on the forces acting on the blade surfaces 73, and the helicopter as a whole will move in the direction of this component.

The overall lift of the rotors may be controlled by the hand lever 44 which may be connected by the cable 25 to the engine accelerator so that a greater power output will automatically result from the engine when an increase of pitch is brought about. The tilting of the wobble plate 82 for horizontal flight in any direction is obtained from the control column 42.

The detail operation of lifting and lowering the wobble plates 82 and tilting the wobble plates will be explained with reference to Figs. 4, 5 and 12. When it is desired to move the wobble plates up and down for the overall pitch setting of the rotors, the hand lever 44 may be manually grasped and moved to a proper position where it may be held by a latch mechanism (not shown) which may be similar to the lug and bracket mechanism 125—126 of Fig. 11. The double acting master cylinders 139 transfer liquid to the double acting slave cylinders 79, causing the arms 76 mounted on the top of the gear box 34 to pivot about the central pivot block 78. This movement causes the sleeves 74 upon which the wobble plates 82 are mounted to move up and down in response to the lever actuation. The two rotors may be trimmed to exactly the same overall pitch and consequently overall torque reaction by operation of the foot levers 43 which act through their associated master cylinders 137 to move the slave motors 79 accordingly. A stop mechanism (not shown) may be used to maintain the foot pedals in any desired position.

The forward and aft movements of the helicopter are controlled by tilting the wobble plates 82 about an axis that is transverse to the helicopter. This is effected by the pilot grasping the hand grips 122 of the control column 42 and rotating associated lever 146, which in turn actuates the master cylinder 123. Fluid flows through the conduits 136 in response to the double acting master cylinder 123 and moves the slave cylinders 102 a corresponding amount, tilting the wobble plate 82. The tilting of the wobble plates 82 about an axis along the length of the helicopter results in moving the helicopter sideways. This wobble plate action is obtained by rotating the cross arm 121 of the control column 42, causing associated cam 131 to act on the levers 129 to actuate the two master cylinders 127 and 128. These master cylinders are connected through conduits 134 and 135, respectively, to actuate the wobble plate slave motors 101 to tilt the two wobble plates 82 in the same direction.

During flight of the helicopter, various forces and disturbances may be imposed upon the rotor system or upon the fuselage. These disturbances will not result in severe strains upon the rotor system or its bearings inasmuch as the gear box 34 is flexibly mounted within the gimbal ring, shown most clearly in Figs. 4 and 5. The gimbal ring in effect acts as a universal joint support for the entire gear box 34 so that the whole gear box and the rotors connected thereto may move freely, restrained only by the resilient force imposed by the springs 52 and the dampening mechanism 53. Accordingly, therefore, severe momentary loads imposed upon the rotor system or fuselage will not result in corresponding stresses in the rotor structure, since the brunt of these momentary forces will be absorbed by the springs 52. The springs 52 also act as a self-orienting mechanism for realigning the rotors with respect to the fuselage when these external forces are relieved.

Having now described in detail one preferred embodiment of our invention, a modified form of structure embodying our invention will be described with reference to Fig. 14. A helicopter fuselage 140 may be suitably provided with landing wheels 141 mounted on struts 142 to the fuselage 140. The power plant of the helicopter 140 may be in the form of a radial engine 143 having the customary cowling 144 thereabout. The entire motor 143 may be mounted to the fuselage 140 by springs 146, thus providing a resilient joint. A gear box 147 may be mounted to the upper surface of the motor and may drive two coaxial contra-rotating rotors 148. Control of the lower rotor 148 may be through a wobble plate 149, as described with reference to the first embodiment of our invention, and four links 151 may connect the wobble plate 149 with the outer part of a ball bearing member 152, the inner race of which may be connected by links 153 to the upper rotor 148 for control of the pitch.

Figure 14:
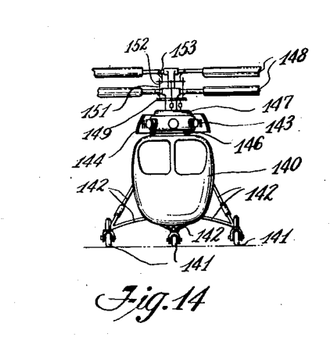
Fig. 14 is a front view of a helicopter embodying our invention as applied to a flexibly mounted motor.

The mounting of the motor of Fig. 14 provides freedom of movement for the rotor system relative to the fuselage, although this is not mechanically centered as when a gimbal ring is employed. Accordingly, freedom of movement between fuselage and rotor system may be obtained, thus greatly relieving the stresses normally imposed upon a conventional rotor system. Although the motor 143 may be of much greater weight than the gear box 34 of the first embodiment, it may nevertheless, if light enough, still give rise to the benefits obtained in the structure of Figs. 1 through 13.

Another embodiment of our invention is illustrated in Figs. 15 through 19, inclusive. Shown in these figures is an intermeshing type of helicopter constructed generally in accordance with the design of our first embodiment, except that the gear box for the rotors is only semiflexibly mounted. This type of construction is particularly adapted to helicopters where rigid mechanical control of the rotor blades is required, which is sometimes requested by certain classes of helicopter users.

Figure 15:
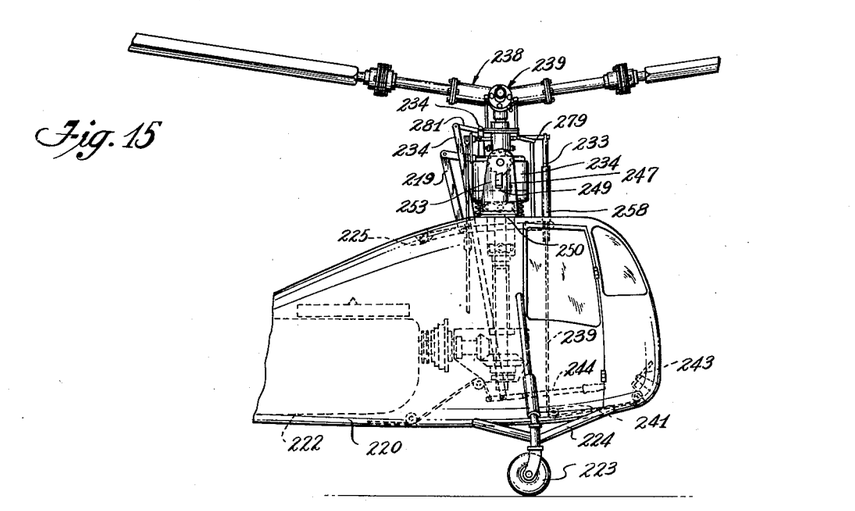
Fig. 15 is a side elevation view of the principal parts of a helicopter embodying a modified form of our invention.
Figures 16, 17:
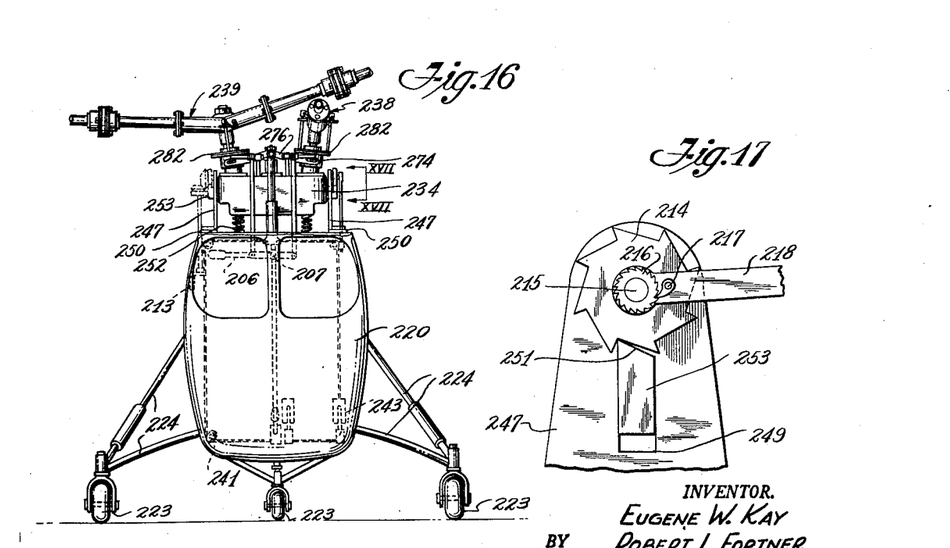
Fig. 16 is a front elevation view of the helicopter of Fig. 15.
Fig. 17 is an enlarged detail view taken along the line XVII—XVII of Fig. 16 and showing details of a ratchet mechanism for injecting a pulse of energy into the rotor system for the purpose of breaking up harmonic vibrations therein.

Referring to Figs. 15 and 16, this modified form of helicopter may include a fuselage 220 having disposed therein a motor 222 and supported upon wheels 223 secured by struts 224 to the fuselage proper. The motor 222 may drive through apparatus similar to that of Fig. 3 to energize a gear box 234 constructed generally similarly to the gear box 34 of the first embodiment. The gear box may support the rotors 238 and 239 and the rotor shafts may be similarly journaled and bushed as the first embodiment and including wobble plates 282.

Referring to all of the Figures 15 through 19, inclusive, it will be noted that no gimbal ring is used in this embodiment, and instead upright brackets 247 may be mounted by rubber pads 250 to the fuselage 220 and may be provided with elongated slots 249. The gear box 234 may be provided with projecting rectangular lugs 253 that pass through the elongated slots 249 in the brackets 247, and these lugs may have an inclined upper surface 251 on their outer ends. Springs 252 may be provided between the gear box 234 and the fuselage 220 to urge the gear box upwardly so that the lugs 253 normally bear against the upper end of the slots 249.

From the foregoing description it will be apparent that the rubber mounts 250 give only a limited amount of movement to the brackets 247 and that the gear box 234 may drop only slightly as the lugs 253 ride in the slots 249. The freedom of movement of the gear box 234 accordingly is quite limited compared to the first embodiment, although there may be a very slight universal motion.

Figure 18:
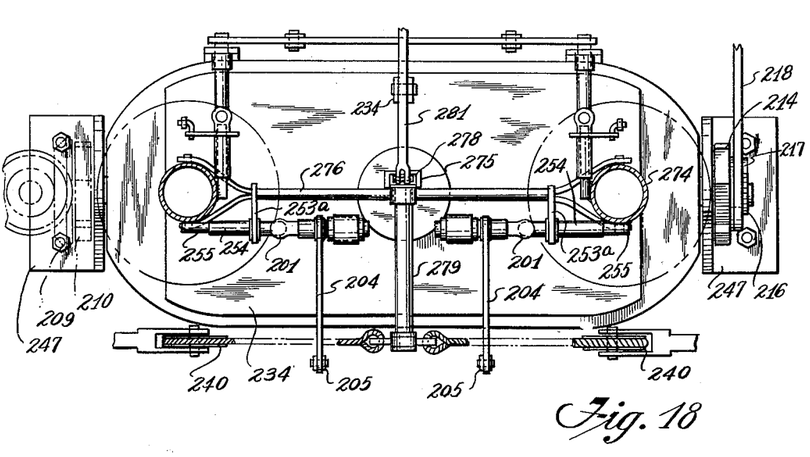
Fig. 18 is a plan view of the gear box assembly of a modified form of our invention.
Figure 19:
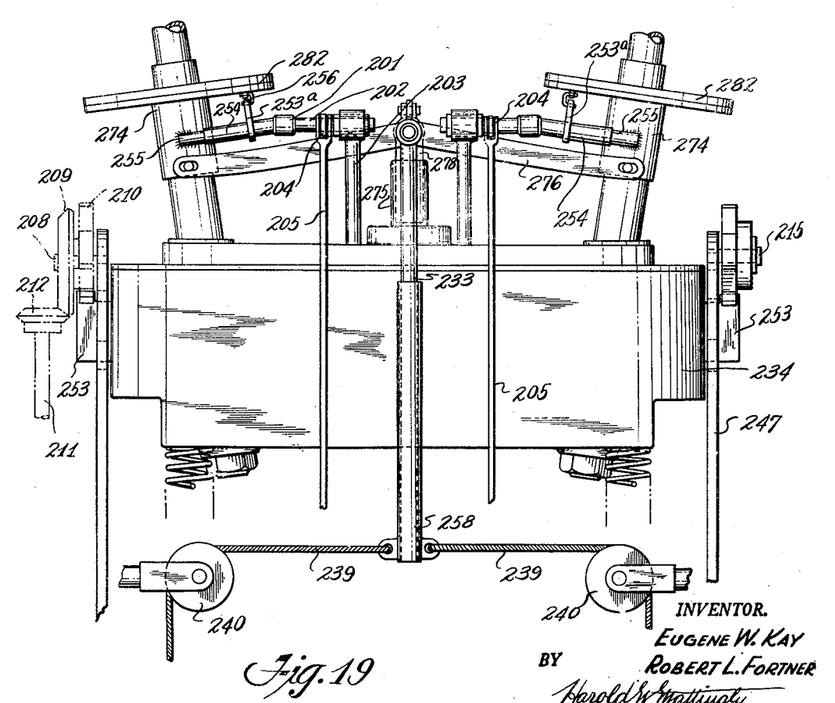
Fig. 19 is a front elevation view of the gear box of Fig. 18.

The gear box 234 may also be provided with wobble plate sleeves 274 which may be raised and lowered on their respective bushings by a single one-piece rocker arm member 276 interengaging both sleeves 274. The rocker arm 276 may be guided in its vertical movement by means of a tongue 278 riding within a slotted member 275. A generally horizontal shaft 279 may pass through the rocker arm to rotatably engage the tongue 278. The rocker arm 276 may be raised and lowered as a whole by raising both sleeves 274 simultaneously by means of a lever 281 fulcrumed upon a bracket 234 and projecting from the upper part of the gear box 234. A generally vertical link 238 may connect the outer end of the lever 281 to a hand control lever 244 operated by the pilot.

The individual overall pitch of each rotor may be varied with respect to the other rotor by means of a downwardly depending lever 233 attached to the outer end of the generally horizontal rod 279 secured to the rocker arm 276. A telescoping member 258 may be secured about the lower end of the lever 233 and may be secured to oppositely disposed control cables 239 passing around pulleys 240. By referring to Figs. 15 and 16 it will be noted that these cables 239 pass around lower pulleys 241 to foot pedals 243 which actuate the cables. When the cables are moved to the left or right, as shown in Figs. 16 and 19, the lever 233 will be caused to swing through a small arc and one collar 274 will be elevated and the other depressed, thus giving relative control of the pitch of the two rotors.

The control of the wobble plates is also mechanically performed by means of cranks 253a mounted on bushings 254 that rotate on spindles 255 welded or otherwise secured to the sleeves 274. The cranks 253a may be connected by links 256 to the wobble plates 282. It will be noted particularly with respect to Fig. 18 that each sleeve 274 is provided with two spindles 255 disposed at right angles to each other so that the wobble plates 282 may be controlled by mechanisms disposed 90° apart.

It will be remembered that the wobble plates must be tilted in planes generally parallel to each other for horizontal directional flight of the helicopter. Accordingly, therefore, if the two cranks 253a that tilt the two wobble plates along an axis parallel to the length of the fuselage are rotated in opposite directions, this parallelism of wobble plates may be secured. Accordingly the two inner sleeves 254 may be connected by means of universal joints 201 to generally horizontal shafts 202 having their other ends held in universal joints in the upper ends of upright brackets 203. Secured to each horizontal shaft 202 may be generally horizontal levers 204 having their outer ends pin-jointed to generally vertical levers 205 having their lower ends connected to a common hand lever 206 fulcrumed at a point between the two levers, such as at 207. Accordingly, manual rotation of the lever 206 will cause movement of the vertical links 205 in opposite directions, causing opposite rotation of the cranks 253a, which causes opposite tilting of the two inner edges of the wobble plates 282 to generally align the two wobble plates. This mechanism therefore controls flight at right angles.

It will also be obvious that the cranks 253a for causing the wobble plates 282 to rotate about a transverse axis of the helicopter may also be actuated by rotation of their respective bushings in opposite directions, and this control may be achieved by an arrangement similar to that described for the sideways control.

A flexible mounting of the gear box 234 makes possible the utilization of another aspect of our invention; namely, the injection of a pulse of energy in the rotor system of the helicopter for the purpose of breaking up harmonic vibrations of the rotor system. The tendency of rotor systems of helicopters to vibrate in rather violent form apparently due to a harmonic vibration appears at present to be characteristic of helicopter designs. Although the flexible mountings of the gear boxes of our invention tend to break up this harmonic vibration, we have nevertheless provided our helicopter with a novel mechanism for stopping such vibrations, which mechanism is made possible because of the novel mounting of the gear box. Accordingly there is shown in Figs. 15 through 19 two such mechanisms mounted respectively one on either gear box supporting bracket 247. Referring to the left support 247, it will be noted that a shaft 208 projects outwardly therefrom upon which is mounted a bevel gear 209 and a notched wheel 210 rigidly secured to the bevel gear 209. A generally vertical shaft 211 may have a small bevel gear 212 secured at its upper end engaging the bevel gear 209 and may have a hand crank 213 (Fig. 16) secured to its lower end. Accordingly, therefore, the pilot may rotate the handle 213 which may have a ratchet drive with the vertical shaft 211 and in turn cause the notched wheel to tend to rotate. This notched wheel momentarily depresses the gear box 234 by causing the lug 253 to move downwardly within the slot 249. It will be remembered, however, that the helicopter is supported by the rotors, which in turn urge the gear box 234 upwardly. Accordingly, therefore, movement of the lug 253 downwardly in the slot 247 in effect raises the entire fuselage 220 and when the peak of one of the notches of the wheel 210 is passed, the entire fuselage drops a small distance, for example one-quarter to one-half of an inch. This sudden dropping of the fuselage with respect to the rotors injects an appreciable amount of energy into the rotor system in the form of a sharp blow. The resultant pulse of energy is often sufficient to break up vibrations in the rotors.

Shown on the right bracket (Figs. 15 through 19) is a second modification of our pulse injection system, and includes a similarly notched wheel 214 mounted on a shaft 215 secured to the upper end of the bracket 247. A ratchet wheel 216 may be secured to the notched wheel 214 and a pawl 217 may be connected to a lever 218 and may engage the ratchet wheel 216. The lever 218 may be pivoted on one end to the shaft 215 and may have its other end connected to a short link 219 having its lower end secured at an intermediate point on a generally horizontal hand lever 225 (Fig. 15). Accordingly, therefore, the pilot may reach upwardly and grasp the hand lever 225 and give it a sharp downward motion. This motion acts through the lever 218 and the pawl 217 to rotate the notched wheel 214, which depresses the gear box lug 253. When a peak of the notched wheel 214 is passed, the entire fuselage then drops with respect to the gear box 234, injecting a pulse of energy into the rotor system as previously described, breaking up the harmonic vibration of the rotors.

The operation of the embodiment of our invention of Figs. 15 through 19 is similar in general to that of the first embodiment of our invention (Figs. 1 through 13, inclusive). The movement of the gear box 234, however, is extremely limited so that a fairly accurate mechanical control of the pitch of the rotors may be obtained. The overall pitch control is obtained by a solid rocker arm 276 which moves bodily upwardly and downwardly to move the sleeves 274 bodily upwardly and downwardly, which in turn moves the wobble plates 282 bodily upwardly and downwardly as described with relation to the first embodiment. This bodily movement of the rocker arm 276 is obtained by rotation of the lever 281 through a link 234 to a hand lever 244 in the pilot's compartment. Relative pitch control of the two rotors to exactly counterbalance torque of the two is obtained by rotation of the rocker arm 276 by means of the downwardly depending lever 233 secured to the horizontal shaft 279. This rotation of the lever 233 is obtained by the cables 239 cross-connected through foot pedals 243 operated by the pilot.

The control of the tilt of the wobble plates 282 is also obtained by mechanical means by rotating the cranks 253a by means of lever linkages 294 and 205 cross-connected to the hand control lever 206. Rotation of this lever manually rotates the bushings 254 on which the cranks are mounted, causing the wobble plates 282 to tilt about an axis along the axis of the fuselage and thereby give sideways horizontal directional flight to the helicopter. Backward and forward flight of the helicopter is obtained by tilting the wobble plates 282 about a transverse axis and the cranks 253a rotated in opposite directions by a mechanism similar to that used for tilting the wobble plates about a longitudinal axis.

Having now described our invention with respect to certain selected embodiments thereof, we have now complied with the patent statutes in showing presently preferred construction. We do not intend to limit ourselves, however, to these specific devices, since it is obvious that many structures fall within the true spirit and scope of our invention. For example, any type of motor may be employed, and any type of drive shaft arrangement may be employed. Brakes and free-wheeling units are, of course, inherent in our design, and are intended to be covered by the illustrations. Nor do we limit our control of our first embodiment to hydraulic systems shown, since it is obvious that pneumatic systems could also be utilized. Likewise, we intend to cover any flexible control system that is suitable, since it is obvious to those skilled in the art that electrical and electronic systems could also be applied with equal effectiveness. As is obvious from an inspection of Fig. 14, we do not care to limit our invention to flexibly mounted gear boxes, as the invention is applicable to various other parts of the motive system, including the engine itself.

These and various other modifications and equivalents are considered by us to fall within the true spirit and scope of our invention, and we do not care to limit ourselves to the illustrated embodiments of our invention, nor otherwise, except by the terms of the following claims.

We claim:

1. In an intermeshing type of helicopter, a gear box, rotor shafts projecting therefrom, bushings secured to the gear box and surrounding a portion of the projecting rotor shafts, a sleeve slidable on each bushing, adjustable pitch blades secured to each rotor shaft, means interconnecting the sleeves and the blades for varying the pitch of the blades, a lever for each sleeve engaging the sleeve with one end and fulcrumed to the gear box, a hydraulic slave motor connected between the lever and the gear box for actuating the lever to move the sleeves and thereby vary the pitch of the blades, master cylinder structure disposed within the helicopter and connected to the slave motors, and a manual control for the master cylinder structure.

2. A helicopter comprising a fuselage, two intermeshing rotors secured thereto and having adjustable pitch blades, wobble plates associated with each rotor, a connection between the wobble plates and the blades for changing the pitch of the blades in response to wobble plate tilt, a first hydraulic motor connected to each wobble plate for tilting the wobble plate about an axis that is longitudinal of the fuselage, a second hydraulic motor connected to each wobble plate for tilting the wobble plate about an axis that is transverse of the fuselage, a master cylinder for each first hydraulic motor connected to the fuselage, a control column disposed within the fuselage and including a rotatable cross arm, means for actuating the two master cylinders simultaneously in response to cross arm rotation, and means connecting the control column to another master cylinder for actuating said second hydraulic motors and simultaneously tilting the wobble plates about a transverse axis in response to back and forth movement of the control column.

EUGENE W. KAY.
ROBERT L. FORTNER.

(References on following page)

REFERENCES CITED

The following references are of record in the file of this patent:

UNITED STATES PATENTS

| Number | Name | Date |
|---|---|---|
| Re. 22,595 | Upson | Jan. 23, 1945 |
| 2,030,578 | Flettner | Feb. 11, 1936 |
| 2,156,334 | Bothezat | May 2, 1939 |
| 2,318,260 | Sikorsky | May 4, 1943 |
| 2,337,570 | Pullin | Dec. 28, 1943 |
| 2,344,967 | Bennett | Mar. 28, 1944 |
| 2,352,404 | Pitcairn | June 27, 1944 |
| 2,360,149 | Maser | Oct. 10, 1944 |
| 2,389,798 | Main | Nov. 27, 1945 |
| 2,395,728 | Dodson | Feb. 26, 1946 |
| 2,402,349 | Sikorsky | June 18, 1946 |
| 2,410,545 | Main | Nov. 5, 1946 |
| 2,410,963 | Chappendelaine | Nov. 12, 1946 |
| 2,476,516 | Thompson | July 19, 1949 |
| 2,494,209 | Sikorsky | Jan. 10, 1950 |

FOREIGN PATENTS

| Number | Country | Date |
|---|---|---|
| 767,068 | France | Apr. 23, 1934 |

OTHER REFERENCES

Ser. No. 254,867, Flettner (A.P.C.), published May 25, 1943.